(12) United States Patent
Obereiner et al.

(10) Patent No.: US 8,190,885 B2
(45) Date of Patent: May 29, 2012

(54) NON-VOLATILE MEMORY SUB-SYSTEM INTEGRATED WITH SECURITY FOR STORING NEAR FIELD TRANSACTIONS

(75) Inventors: Willy Obereiner, San Jose, CA (US); Jeremy Isaac Nathaniel Werner, San Jose, CA (US)

(73) Assignee: Spansion LLC, Sunnyvale, CA (US)

( * ) Notice: Subject to any disclaimer, the term of this patent is extended or adjusted under 35 U.S.C. 154(b) by 1144 days.

(21) Appl. No.: 11/614,257

(22) Filed: Dec. 21, 2006

(65) Prior Publication Data
US 2008/0155258 A1    Jun. 26, 2008

(51) Int. Cl.
*G06F 21/00* (2006.01)
(52) U.S. Cl. ....................................................... 713/156
(58) Field of Classification Search .................... 713/156
See application file for complete search history.

(56) References Cited

U.S. PATENT DOCUMENTS

| | | | |
|---|---|---|---|
| 2004/0100380 A1* | 5/2004 | Lindsay et al. | 340/540 |
| 2005/0109841 A1* | 5/2005 | Ryan et al. | 235/380 |
| 2005/0171898 A1* | 8/2005 | Bishop et al. | 705/39 |
| 2005/0191968 A1* | 9/2005 | Tabayashi et al. | 455/74 |
| 2005/0216651 A1* | 9/2005 | Tanabiki et al. | 711/100 |
| 2005/0222961 A1* | 10/2005 | Staib et al. | 705/64 |
| 2006/0165060 A1* | 7/2006 | Dua | 370/352 |
| 2006/0287964 A1* | 12/2006 | Brown | 705/64 |
| 2007/0200664 A1* | 8/2007 | Proska et al. | 340/5.42 |

* cited by examiner

*Primary Examiner* — Michael S McNally
(74) *Attorney, Agent, or Firm* — Turocy & Watson, LLP

(57) ABSTRACT

An architecture is presented that facilitates maintaining a log of near field transactions in a memory module that includes security functionalities and near field communication (NFC) capabilities. The memory module comprises non-volatile memory that stores security software and a security processor that accesses the security software from the nonvolatile memory and performs security functions based on the security software stored. The non-volatile memory is divided into partitions by the security processor. NFC radio frequency (RF) communication capabilities are integrated into the memory module such that the memory module directly interfaces to an external NFC antenna. This facilitates NFC communications within the secure environment of the memory module. Further, the memory module stores data related to near field transactions so that this data can be subsequently reviewed and exported in an appropriate format.

24 Claims, 14 Drawing Sheets

NON-VOLATILE MEMORY SUB-SYSTEM INTEGRATED WITH SECURITY FOR STORING NEAR FIELD TRANSACTIONS

BACKGROUND

Robust security is high desirable for network-based systems, particularly for applications that are employed in connection with sensitive information, to prevent unauthorized agents from intercepting, corrupting or publishing sensitive data. A suitable information security system should perform with minimum disruption to users to ensure that authorized users are neither erroneously denied access nor unduly restricted in performing duties.

Near field communication radio frequency (NFC RF) technology has become an increasingly popular form of connectivity technology. Generally operating at 13.56 MHz and transferring data at up to 424 Kbits/second, NFC provides both a "read" and "write" technology. Communication between two NFC-compatible devices occurs when they are brought within four centimeters of one another: a simple wave or touch can establish an NFC connection which is then compatible with other known wireless technologies such as Bluetooth or Wi-Fi, etc. Products with built-in NFC technology will dramatically simplify the way consumer and industrial devices interact with one another, helping to speed up connections, receive and share information and even make fast and secure payments.

However, a problem common to security-based systems and NFC technology is vulnerability of the security functionality. Compromise of the security functionality within NFC RF technology results in system failures. This is a major concern, since attackers using sophisticated techniques have compromised a wide variety of existing systems, resulting in the intercepting, corrupting or publishing of sensitive data.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a system for data storage and retrieval wherein a memory module facilitates integrated security and NFC/RF capabilities. The memory module includes non-volatile memory that stores security software and a security processor that accesses the security software from the nonvolatile memory and performs security functions based on the security software stored. Furthermore, a near field communication (NFC) radio frequency (RF) component is integrated into the memory module to facilitate NFC functionality and storage of data associated with NFC transactions within the secure environment of the memory module. Thus, NFC wireless protocol capabilities, security functionalities and corresponding data storage are tightly coupled together and executed within the secure execution environment. Integration of the NFC RF component coupled with the storage of NFC transactions in the memory module allows non-volatile memory within the memory module to directly interface to an NFC antenna positioned outside of the memory module thereby establishing a secure line of communication.

In another aspect of the claimed subject matter, the data storage and retrieval system including the memory module and the NFC RF component further enables reading and/or writing RFID (Radio Frequency Identification) data. The memory module with the NFC RF component can be included in a mobile device capable of conducting for example, financial transactions. The read/write ability of the NFC RF component allows it to log the transactions in the secure non-volatile memory. This data can be later presented in an appropriate format such as summary or detailed reports generated by a processor included in the security processor.

In another aspect of the claimed subject matter, a data storage and retrieval system comprising the memory module and the read/write NFC RF component can be included in a RFID sensor node (a RFID tag with sensors on board), thereby enabling it to monitor the conditions around the tag and log this data to the secure memory module. Hence the RFID tag itself would be an RFID reader storing data in its own secure memory module. This data is later collected for information regarding various aspects such as how a product was handled, the time and processing conditions, its transportation details etc. This information can be presented in an appropriate format such as summary or detailed reports by a processor included in the security processor.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
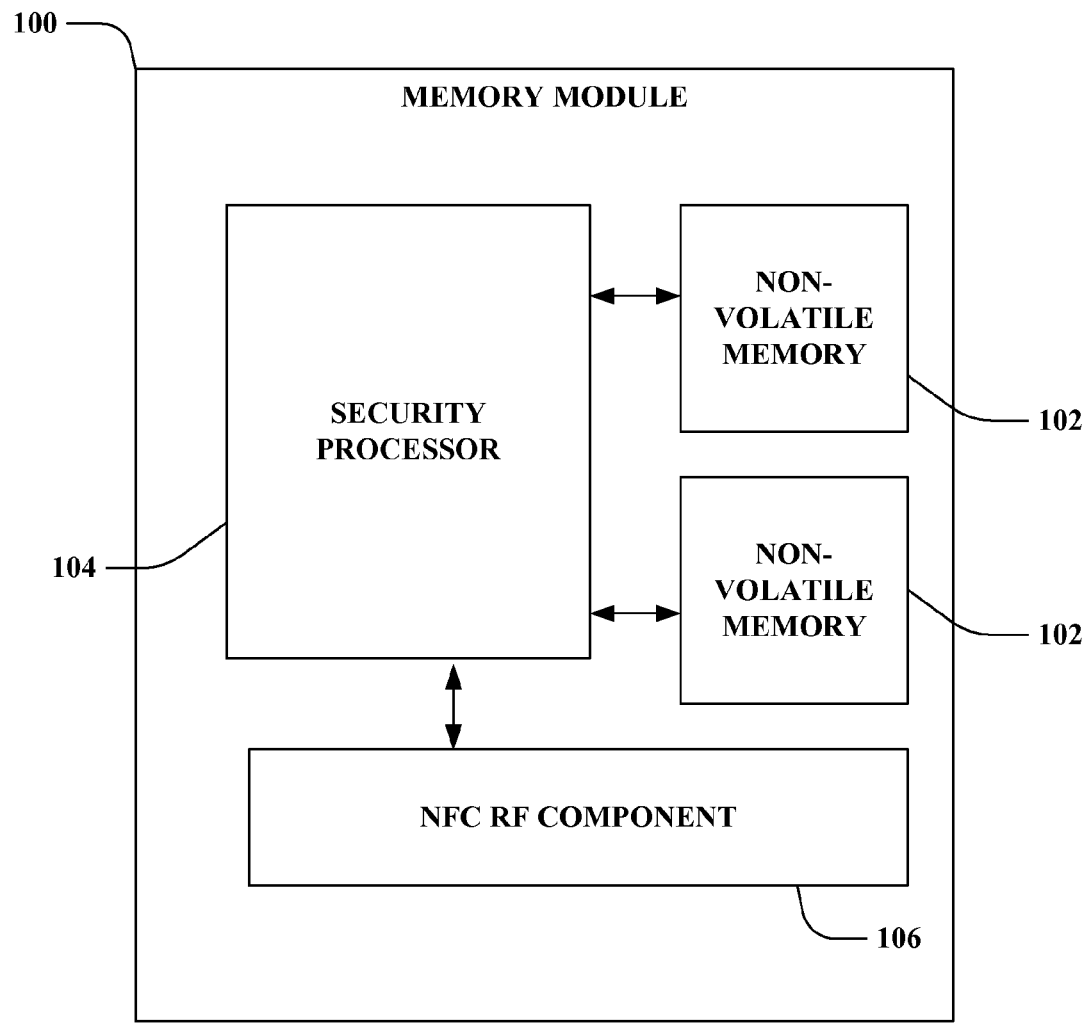
FIG. 1 illustrates a block diagram of a memory module with an integrated NFC RF component.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Additionally, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer-readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Security is important for network-based systems, particularly for applications that deal with sensitive information, to prevent unauthorized agents, in the form of hardware and/or software, from intercepting, corrupting or publishing sensitive data. As stated supra, suitable information security system should perform with minimum disruption to users to ensure that authorized users are neither erroneously denied access nor unduly restricted in their duties. Accordingly, the following subject matter optimizes processor utilization and creates a heightened level of security for NFC applications.

A system that facilitates integrated security capabilities and NFC functionality is disclosed. It comprises a memory module with a security processor that provides for concurrent processing of security protocols, a component to implement NFC functionality along with non-volatile memory to facilitate storing and processing data associated with NFC transactions. The memory module thus establishes a heightened level of security as the NFC transactions are conducted from within its secure environment. The memory module further facilitates subsequently exporting the data from the non-volatile memory in a desired format.

Referring initially to the drawings, FIG. 1 illustrates a memory module 100 that facilitates integrated security, NFC communication and data storage capabilities in accordance with an innovative aspect. The memory module 100 is a package of multiple chips or integrated circuits, wherein one integrated circuit houses a security processor 104, another integrated circuit houses non-volatile memory 102 while a third integrated circuit makes up the NFC RF component 106. The integrated circuits are then coupled together to form the memory module 100. It is to be appreciated that such coupling can be in any suitable manner for carrying out the functionalities described herein (e.g., through hard connection, optically, wirelessly . . . ). Furthermore, the non-volatile memory 102 of the memory module 100 stores security software for use by the security processor 104. The non-volatile memory 102 is typically flash memory, but can be any type of non-volatile memory typically used for the task of secondary storage, or long-term persistent storage. Furthermore, one or more non-volatile memory 102 can be included in the memory module 100. If more than one non-volatile memory 102 is included, the non-volatile memory 102 is not required to be of the same type and/or density.

The security software includes password authentication software, shared key authentication software, public key infrastructure (PKI) authentication software, integrity check software, encryption/decryption software, anti-virus software, anti-spyware software, secure communication software, and any other type of security software available. The security software is directly embedded into the non-volatile memory 102 to provide integrated security capabilities within the memory module 100. The security processor 104 accesses the security software from the non-volatile memory 102 and performs security functions based on the specific security software stored. The security processor 104 controls the entire non-volatile memory storage and monitors all traffic to and from the non-volatile memory components 102.

Furthermore, a near field communication (NFC) radio frequency (RF) component 106 is included in the memory module. NFC technology is a short-range wireless connectivity technology that evolved from a combination of existing RFID (Radio Frequency Identification) and interconnection technologies. Typically operating at 13.56 MHz and transferring data at up to 424 Kbits/second, NFC provides both a "read" and "write" technology. It is to be appreciated that any suitable operating frequency and data transfer rate can be employed. Communication between two NFC-compatible devices occurs when they are brought within a particular distance (e.g., four centimeters of one another). A simple wave or touch can establish an NFC connection which is then compatible with other known wireless technologies such as Bluetooth or Wi-Fi, etc. NFC can be used with a variety of devices, from mobile phones that enable payment or transfer information to digital cameras that send their photos to a television (TV) set with just a touch, it also enables NFC devices, like your mobile phone or PDA, to act as an electronic key to access your home, office, or car, or to pay for—as well as to act as—your transport ticket.

For example, NFC applications include "Touch and Go" applications such as access control or transport/event ticketing, where the user brings the device storing the ticket or access code close to the reader. "Touch and Confirm" applications such as mobile payment where the user has to confirm the interaction by entering a password or just accepting the transaction. "Touch and Connect" applications such as linking two NFC-enabled devices to enable peer to peer transfer of data such as downloading music, exchanging images or synchronizing address books, and "Touch and Explore" applications such as exploring a device's capabilities to find out which functionalities and services are offered.

Accordingly, NFC technology provides secure storage for your confidential personal data, such as credit card numbers, coupons, membership data or digital rights. And by providing a fast and easy connection between a PC and mobile phone or a TV and PDA, it allows a user to update and align appointments or any other data. For example, NFC allows a user to load the departure times of a bus into a mobile device by simply holding it close to the NFC-enabled timetable, or access the latest film news and reviews at the cinema by walking up to an NFC-enabled poster.

In the industrial sector, NFC technology when combined with sensors delivers great value and functionality. RFID is an Automatic Identification and Data Capture (AIDC) method that uses an EPC (electronic product code) to provide data about a product that is not normally available through a regular bar code. RFID systems are made up of two main components the RFID tags and RFID readers. A large amount of data that was heretofore stored on servers and recovered via barcodes can now be stored on RFID tags which may have their own power source and on board memory. If these tags are provided with sensors they can sense and record a variety of data regarding a product and its processing details. With such sensitive data stored on these radio chips, it is desirable that this data is secured with proper access rights provided only to authorized personnel.

Positioning the NFC RF chip 106 within the memory module 100 allows NFC functionality within a secure execution environment. NFC wireless protocol capabilities and security capabilities such as access controls and secure offloading (e.g., encryption on the fly, checking rights, authenticating a user, authenticating components within the system, channel encryption, etc.) as well as data storage are all executed within the secure execution environment of the memory module 100. Furthermore, positioning of the NFC RF chip 106 within the memory module 100 also enables the secure non-volatile memory 102 to directly communicate with the NFC RF chip 106 via the security processor 104. The security processor 104 controls the entire non-volatile memory storage and monitors all traffic to and from the non-volatile memory components 102.

Figure 2:
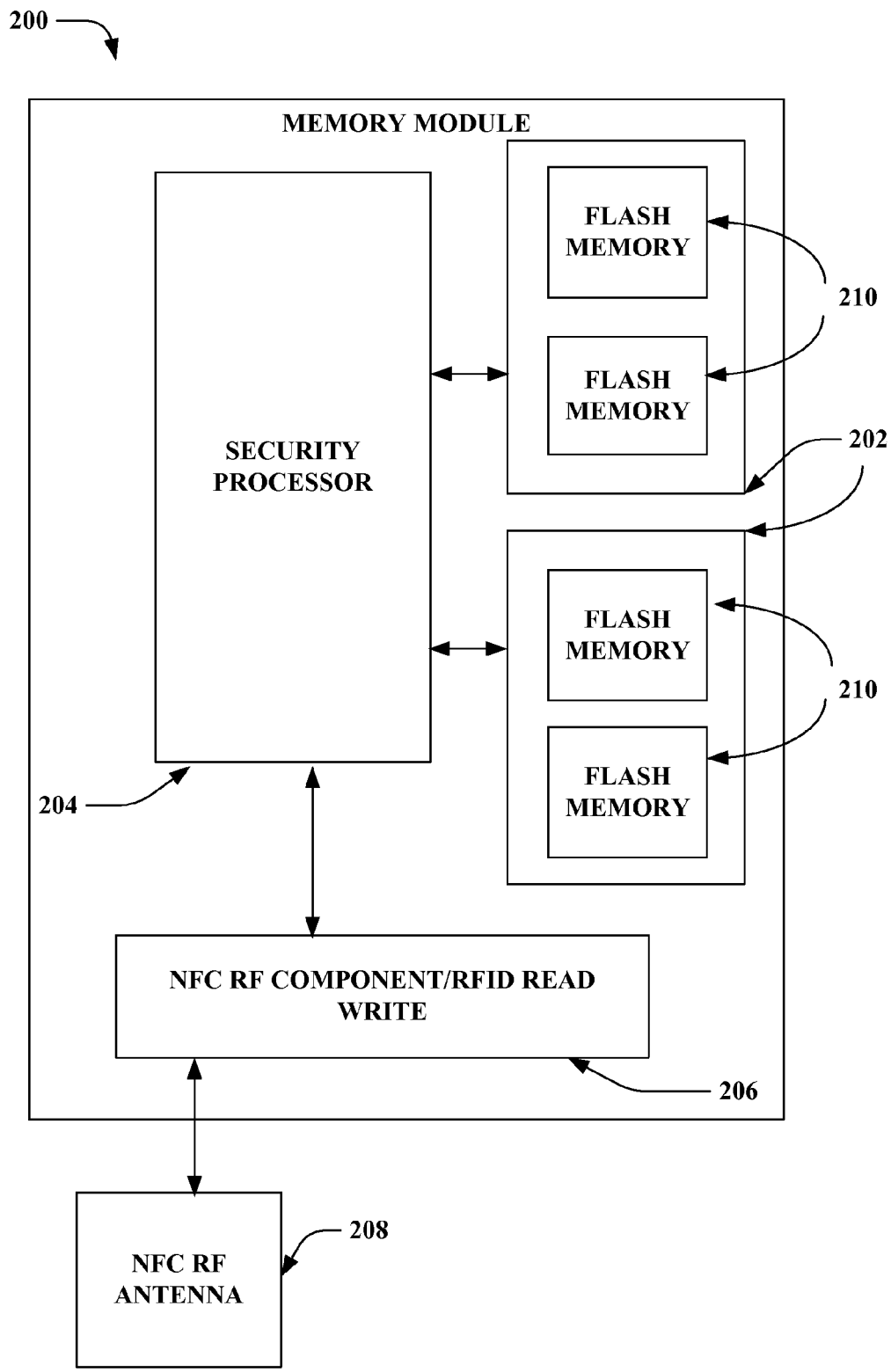
FIG. 2 illustrates a block diagram of the memory module with partitioned non-volatile memory wherein a NFC RF component is a separate IC located within the memory module.

As illustrated in FIG. 2, the memory module 200 communicates with an outside antenna 208 to facilitate NFC RF transactions. Accordingly, the NFC RF component 206 acts as an RFID reader/writer in order to read and record the data in the non-volatile memory or flash memory 202. Thus, the flash memory 202 included with the memory module 200 facilitates storing not only the security software for the security processor 204 but also transaction data associated with any NFC transactions that may involve the NFC RF chip 206. To date, such information has often been stored in an arbitrary fashion on monolithic memory components wherein access control to the information was largely a purview of software rather than hardware. Accordingly, partitions 210 may be created within the flash memory 202 of the memory module 200 by the security processor 204 whereby different users may have different access rights based on their attributes and authentication credentials supplied. This provides hardware access control and authentication by the security processor 204 for each partition 210 that it creates within the flash memory 202. As the means for creating partitions and controlling access to such partitions is included with the memory module, it provides a heightened security as compared to memory systems that rely on external entities for partitioning and access control.

Communication between the external antenna 208 and the NFC RF component 206 takes place when a signal emitted by the NFC RF component is intercepted by the antenna as the component passes within the range of the antenna. As the NFC RF component 206 incorporates both read/write capabilities the information stored in the flash memory 202 may be modified or rewritten during a NFC RF transaction by an external entity or by the security processor 204 depending on the access rights and the particular partition involved in the transaction thereby ensuring data security and integrity.

Figure 3:
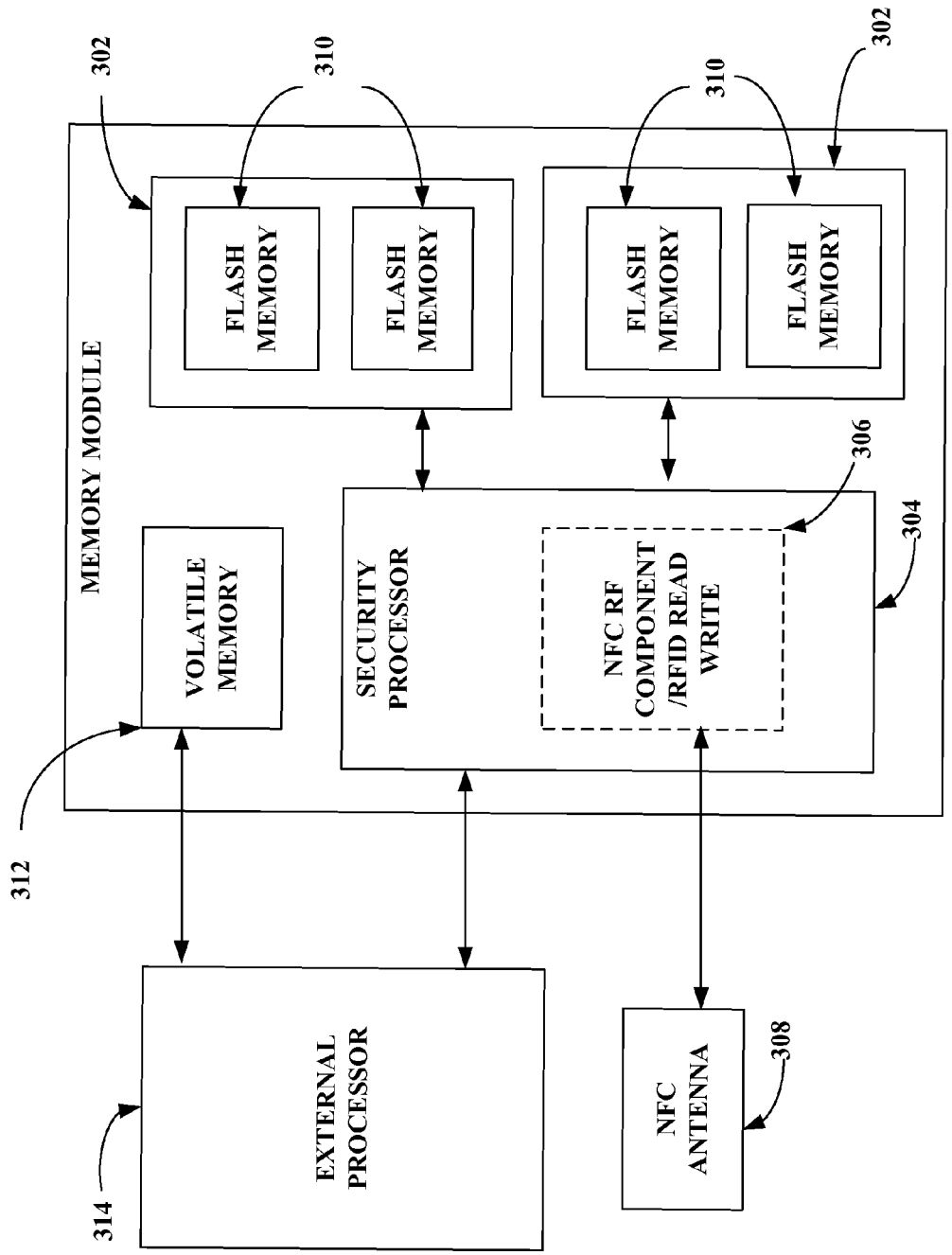
FIG. 3 illustrates a block diagram of the memory module wherein the NFC RF is integrated directly into a security processor.

In another embodiment as illustrated in FIG. 3, an NFC RF component 306 is directly integrated into the security processor 304 in one integrated circuit. Providing the NFC RF component 306 directly within the integrated circuit of the security processor 304 allows NFC functionality within the secure environment of the memory module 300. Thus, NFC wireless protocol capabilities and security capabilities such as access controls and secure offloading (e.g., encryption on the fly, checking rights, authenticating a user, authenticating components within the system, channel encryption, etc.) are tightly coupled together and executed within the secure execution environment. Further, integration of the NFC RF component 306 directly within the security processor 304 also enables the secure flash memory 302 with partitions 310 to directly interface to an NFC antenna 308 positioned outside of the memory module 300 to further enable secure implementation of the NFC technology.

Accordingly, the integration and tight coupling of the NFC technology and security capabilities in the memory module 300 enable updateable field implementations. For example, the integration provides updateable keys and accounts in the field over the air, applies time expiration to the keys and accounts, enables NFC capability within the portable electronics and provides flexible re-allocation of the system memory. Uses for this NFC capability can include, but are not limited to, secured proximity payments, secured proximity payments including terminal based authentication of the user, secure physical access to doors, electronic transfer of physical access keys, local payments, local debit account payments, over the air pre-paid payments, data downloads from billboards and posters, micro-payments to vending machines, ticketing (e.g., trains, buses, and subways), a radio frequency identification (RFID) inventory reader and/or writer, and storing sensor data associated with processing a product.

Furthermore, as shown in FIG. 3, the memory module 300 also includes volatile memory or random access memory (RAM) 312 used for primary storage that communicates with the external processor 314. Accordingly, the security processor 304 controls the flash memory storage 302 and NFC RF aspects and monitors traffic to and from the flash memory components 302. Further, the security processor 304 provides for concurrent processing of security protocols and NFC capabilities while the external processor 314 executes normal functions. However, processing security protocols does not imply that the data being processed is either secure or not secure. Allowing the security processor 304 to control the security functionality of the flash memory 302 alleviates the external processor 314 from having to execute interrupts associated with security functions. Accordingly, both the security processor 304 and the external processor 314 coordinate read/write access to the flash memory 302 so as to optimize processor/memory utilization while ensuring a heightened level of security for NFC technology.

Figure 4:
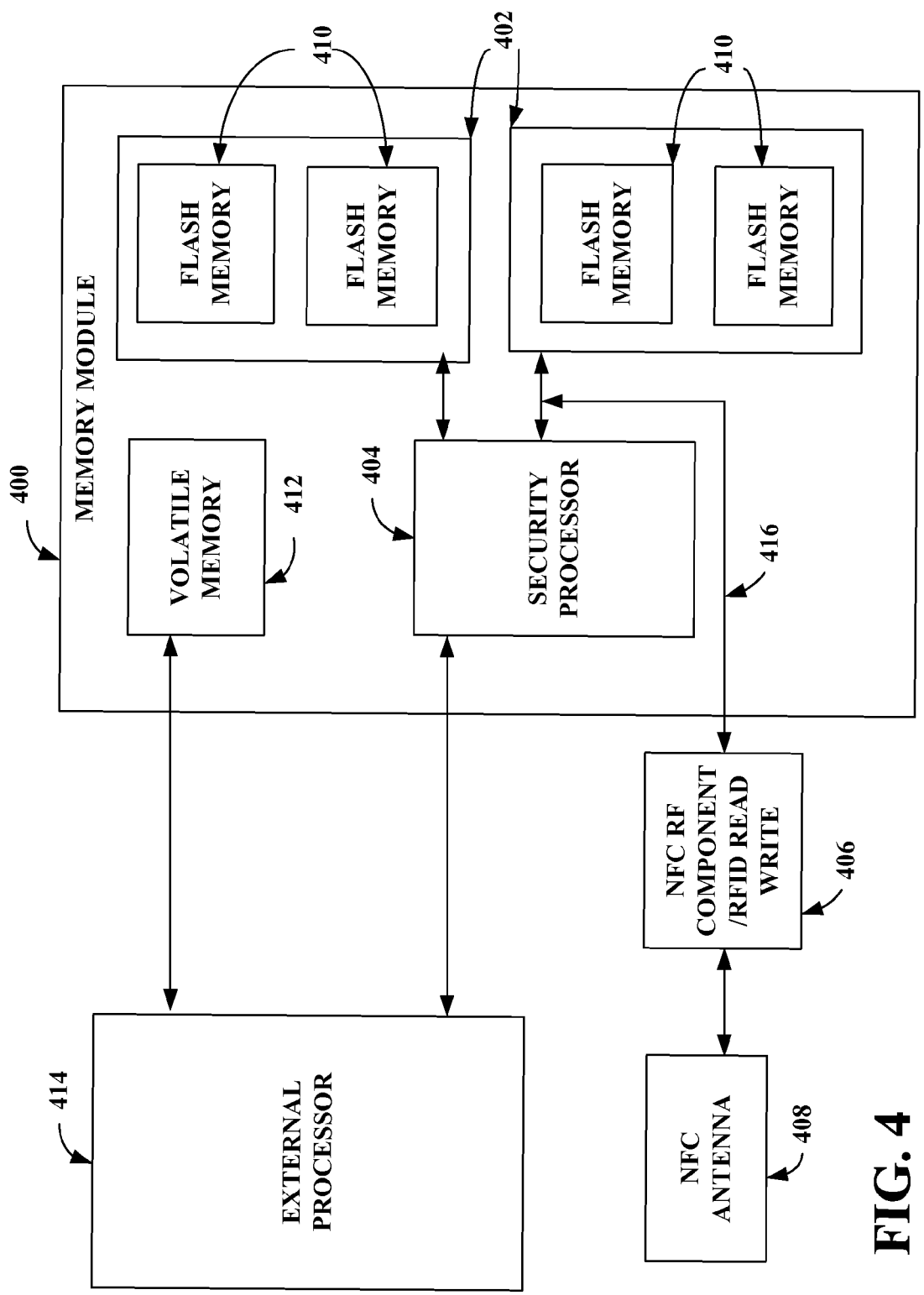
FIG. 4 illustrates a block diagram of the memory module wherein the NFC RF is a separate IC located outside of the memory module.

In another embodiment as illustrated in FIG. 4, an NFC RF component 406 is a separate integrated circuit located outside of the memory module 400. The NFC RF component 406 directly communicates with the security processor 404 and flash memory 402 via a dedicated bus 416. The dedicated bus 416 allows NFC wireless protocol capabilities and security capabilities such as access controls and secure offloading (e.g., encryption on the fly, checking rights, authenticating a user, authenticating components within the system, channel encryption, etc.) to be executed within the secure execution environment of the memory module 400. Further, the NFC RF chip 406 directly interfaces to an NFC antenna 408 positioned outside of the memory module 400 to further enable secure implementation of the NFC technology.

The security processor 404 communicates with an external processor 414, such that the security processor 404 provides for concurrent processing of security protocols and NFC capabilities while the external processor 414 executes normal functions. Furthermore, the memory module 400 also includes volatile memory or RAM 412 used for primary storage that communicates with the external processor 414.

Figure 5:
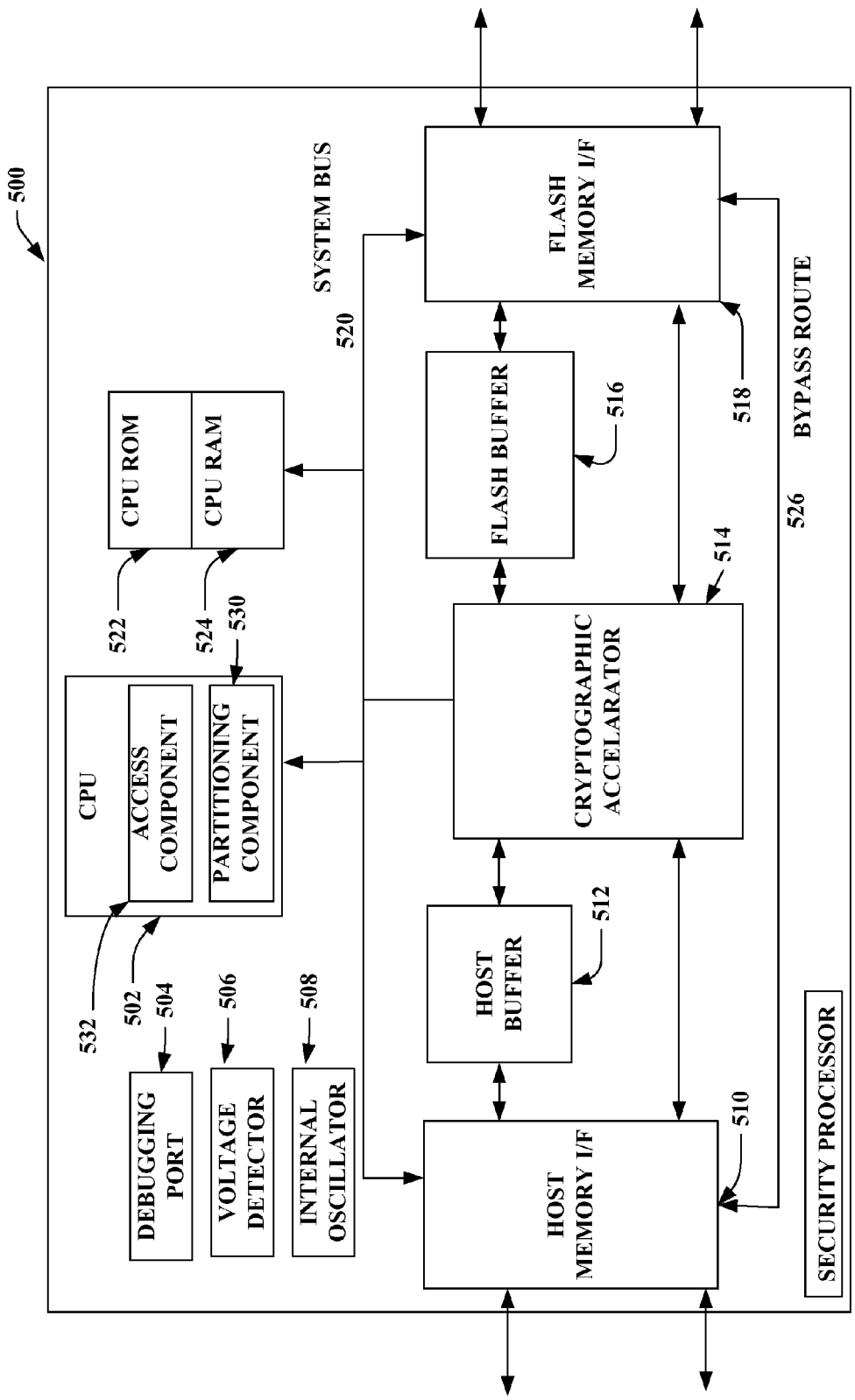
FIG. 5 illustrates a block diagram of a security processor of the memory module.

In more detail, FIG. 5 illustrates components of security processor 500. The security processor 500 includes a central processing unit (CPU) 502 or any other type of low power application processor. The CPU 502 within the security processor 500 can manage flash memory storage (not shown) and provide a secure environment to implement authentication algorithms, security software and data retrieval functions such as report generation. The security processor 500 also includes a joint test action group (JTAG) port 504 that prevents tampering and/or a mechanism for debugging the system, a voltage detector 506 that indicates the voltage level of the security processor 500, and an internal oscillator 508 that provides a clock for the security processor 500. However, other mechanisms (not shown) can be provided that help prevent tampering. For example, temperature detecting, metal overlay (to hide signals), and scrambling of signals are additional methods that can be utilized in the security processor 500. A host memory interface (I/F) 510 handles all the flash memory transactions with a host processor (not shown). Specifically the host memory I/F 510 manages signaling, thus complying with the interface definitions of the flash memory. The host memory I/F 510 also manages interpretation or differentiating between a secure and non-secure request, and monitoring requests via enforcing access rights and permissions.

A host buffer 512 holds data for secured transactions to and from the host processor. The buffer 512 also serves as a mailbox between the CPU 502 and the host processor, wherein interpretation of the messages is carried out by the CPU 502. A cryptographic accelerator 514 that performs all the cryptographic algorithms, symmetric and a-symmetric needed by the system. The CPU 502 configures the cryptographic accelerator 514 and can control the data flow through the security processor 500. The CPU 502 interfaces a system bus 520 and the security applications that run on the CPU 502, arbitrating with the host processor. A flash buffer 516 holds data to and from the flash memory. The flash buffer 516 enables processing of a page while receiving the next page. A flash memory I/F 518 that handles all transactions to and from the flash memory storage and the security processor 500, such as signaling and interpretation.

A system bus 520 that allows the CPU 502 to communicate with the different components of the security processor 500. CPU ROM/RAM 522 and 524 contains code and data used by the CPU 502. The ROM 522 stores the CPU boot loader (not shown). Further, resident code and code overlays execute from the integrated CPU RAM 524. In operation, the host processor communicates with the security processor 500 and accesses the flash memory directly via a bypass route 526. Or, the host processor can communicate via the memory manager (not shown) running on the security processor 500 and access the flash memory through communications with the memory manager. In either case, access rights are enforced by the security processor 500 according to the security software embedded in the flash memory.

Furthermore as described supra, the flash memory may be divided into multiple partitions of varying sizes and access rights by the CPU 502. As illustrated, the CPU 502 includes a partitioning component 530 that can facilitate and effectuate partitioning of the flash memory included in the memory module and, an access component 532 that can ascertain and determine in concert with associated ROM 522 and/or RAM 524 and one or more internal registers (not shown) associated with memory module whether or not an entity attempting to access a particular partition has been assigned, or has appropriate, access rights to be granted access to the partition. Thus, secure partitioning is utilized to protect essential data and code, sensitive information, and allow easy access to common public data. Secure partitioning allows separate access controls to different partitions of data which could be made available based on user, service provider, original equipment manufacturer (OEM), enterprise authentication, or any other type of authentication available. The access controls distinguish between read and write (or erase) permissions. The NFC capabilities build on the secure partitioning capabilities to enable independent third parties control of the secure memory. This control allows the independent third parties to install keys and/or account details as needed per user/mobile device, and to provide tracking of data.

Figure 6:
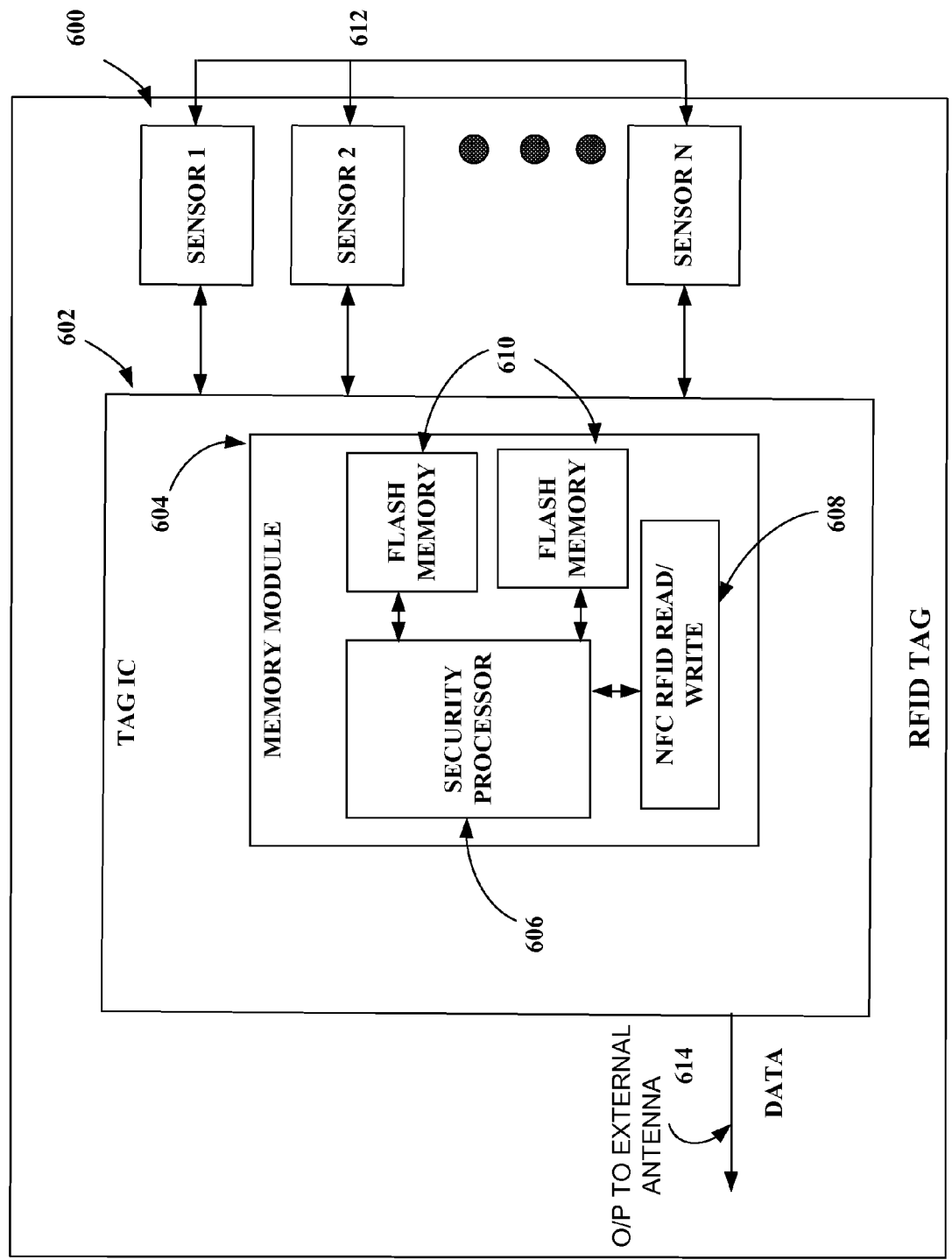
FIG. 6 illustrates a block diagram of a system comprising the memory module integrated with an NFC RF component used to sense and log various parameters of an environment of a product bearing the system thereon.

FIG. 6 is a secure system employed to collect and store data in accordance with an aspect of the claimed subject matter. As stated supra, NFC/RFID can be used to collect information regarding various environmental conditions associated with a product. Accordingly, a block diagram of a RFID transponder/tag comprising a secure memory module to record and retrieve data in accordance with the claimed subject matter is shown. RFID tags are broadly classified by their ability to power their circuits. Passive RFID tags depend on a reader field for power and therefore provide data only upon receiving a signal from the reader. Active tags have their own power source and therefore can transmit data on demand or volunteer it periodically. When combined with sensors, RFID tags can be used to log and report temperature, pressure and other conditions regarding a product even as it is being manufactured.

The system 600 is an RFID read/write tag that comprises an integrated circuit chip 602 that incorporates a memory module 604 for storing data associated with NFC transactions. The memory module 604 comprises a security processor 606, partitioned flash memory 610 and a NFC RF component 608 as discussed supra with respect to FIG. 2 or FIG. 4. Alternatively, the NFC RF component 608 may be integrated directly into the security processor 606 by fabricating it on the same chip as the security processor as shown in FIG. 3. The NFC RF component 608 demodulates digital data embedded in an RF carrier received by the tag. When acted upon by a carrier signal from an external reader or upon a signal from an internal clock the RFID tag 600 transmits required data contained within the memory module 604 through the NFC RF component 608 which can modulate the data for transmission to an RFID interrogator or reader (not shown). The tag IC 602 is normally connected to an internal antenna fabricated on the substrate of the tag 600 for communicating information. However, integration of NFC RF component 608 into the memory module 604 facilitates direct communication of information 614 to an external antenna. A rectifier (not shown) may be employed to harness power from the reader signal. However, this is not always necessary. For example, active/semi passive tags have their own internal power sources and would not be dependent for power on a RFID reader field. Additionally, the system comprises various sensors 612 (sensor 1, sensor 2, . . . sensor N) such as temperature, pressure, motion sensors etc. that interface with the tag IC 602 to sense and securely record data regarding the various environmental conditions of a product that carries the RFID tag 600.

The integration of the security processor 606 and the partitioned flash memories 610 within the memory module 604 results in a memory system that contains the hardware means for enforcing partitions within it. When combined with an NFC RF component 608 that directly outputs to an external antenna, it establishes a secure chain of communication within a large memory space thereby mitigating access to sensitive data by unauthorized or malicious entities.

Figure 7:
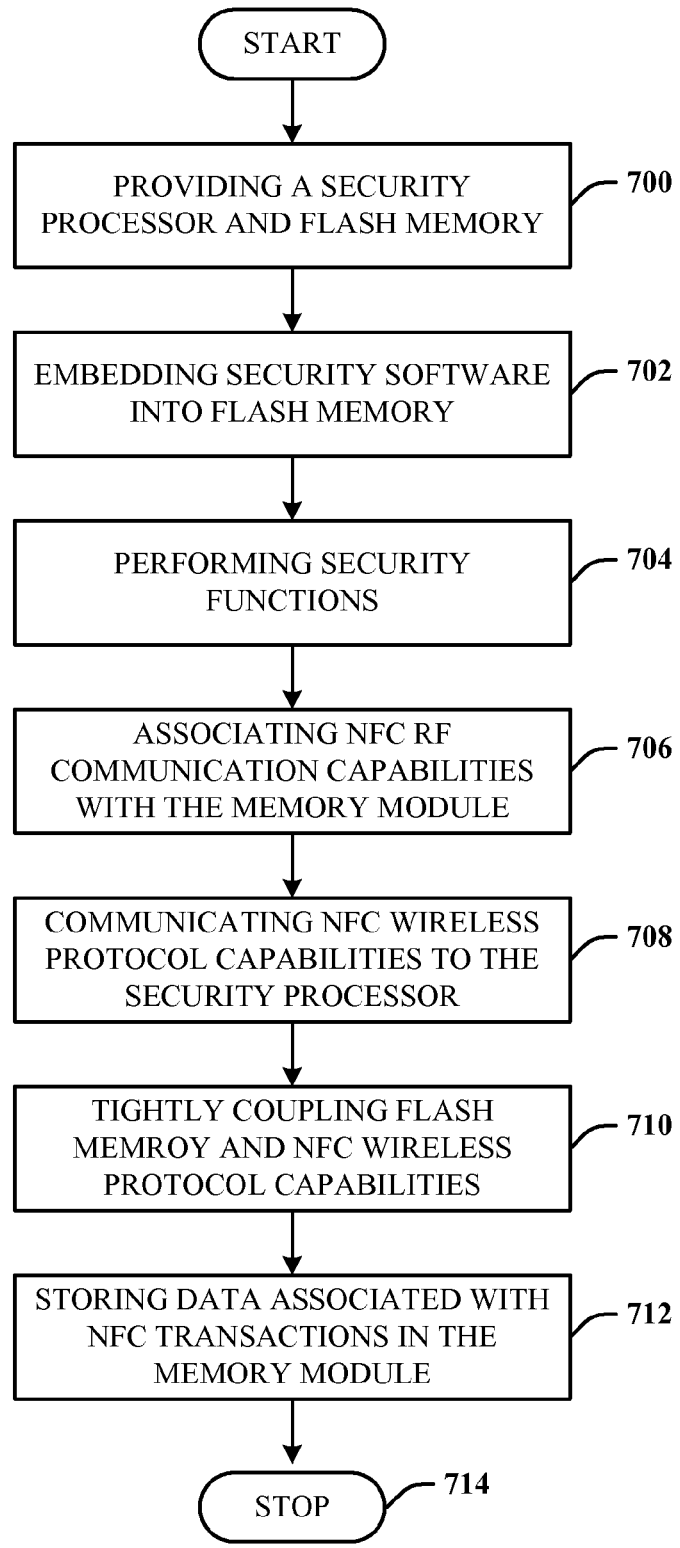
FIG. 7 illustrates a flow chart of a method of integrating security functionality, NFC communication and NFC transaction data storage capabilities in the memory module.

Referring to FIG. 7, a method of integrating security functionality and NFC capabilities in a memory module is illustrated. At 700, a security processor and flash memory are provided within the memory module. The memory module is a package of multiple chips or integrated circuits, wherein one integrated circuit houses the security processor and another integrated circuit houses the flash memory. The integrated circuits are then coupled together to form the memory module. At 702, security software is embedded into the flash memory. The security software includes password authentication software, shared key authentication software, PKI authentication software, integrity check software, encryption/decryption software, anti-virus software, anti-spyware software, etc. It is thus to be understood that any suitable security software and algorithms are contemplated and intended to fall under the scope of the hereto-appended claims.

At 704, security functions are performed via the embedded security software. And at 706, NFC RF capabilities are provided to the memory module. This may involve any one of integrating the NFC RF directly within the integrated circuit of the security processor, providing NFC RF capabilities on a separate chip packaged with the security processor into the memory module or providing a dedicated bus for communication between the security processor and a NFC chip outside the memory module. All of these procedures will allow NFC functionality within the secure environment of the memory module. Thus, NFC wireless protocol capabilities and security capabilities such as access controls and secure offloading (e.g., encryption on the fly, checking rights, authenticating a user, authenticating components within the system, channel encryption, etc.) and data storage/retrieval are tightly coupled together and executed within the secure execution environment. Further, integration of the NFC RF directly within the security processor also enables the secure flash memory to directly interface to an NFC antenna positioned outside of the memory module to further enable secure implementation of the NFC technology.

At 708, NFC wireless protocol capabilities are communicated to the security processor. As stated supra, the secure flash memory directly interfaces with the NFC antenna via the security processor, which in turn communicates the NFC wireless protocol capabilities to the security processor for execution within the secure environment of the memory module. At 710, the flash memory and the NFC wireless protocol capabilities are tightly coupled to create a trusted, secure environment for the NFC wireless protocol capabilities. Accordingly, the security processor controls the entire flash memory storage and the NFC RF, monitors all traffic to and from the flash memory components, and enforces the access rights associated with the memory partitions. And at 712, any data associated with NFC transactions is stored in the partitioned memory upon appropriate authentication by the security processor. For example, a mobile device bearing the memory module with the NFC capability can be employed for making a credit card payment. All the data regarding the transaction is stored in the memory module and is later provided in a desired format as a summary or detailed report.

Figure 8:
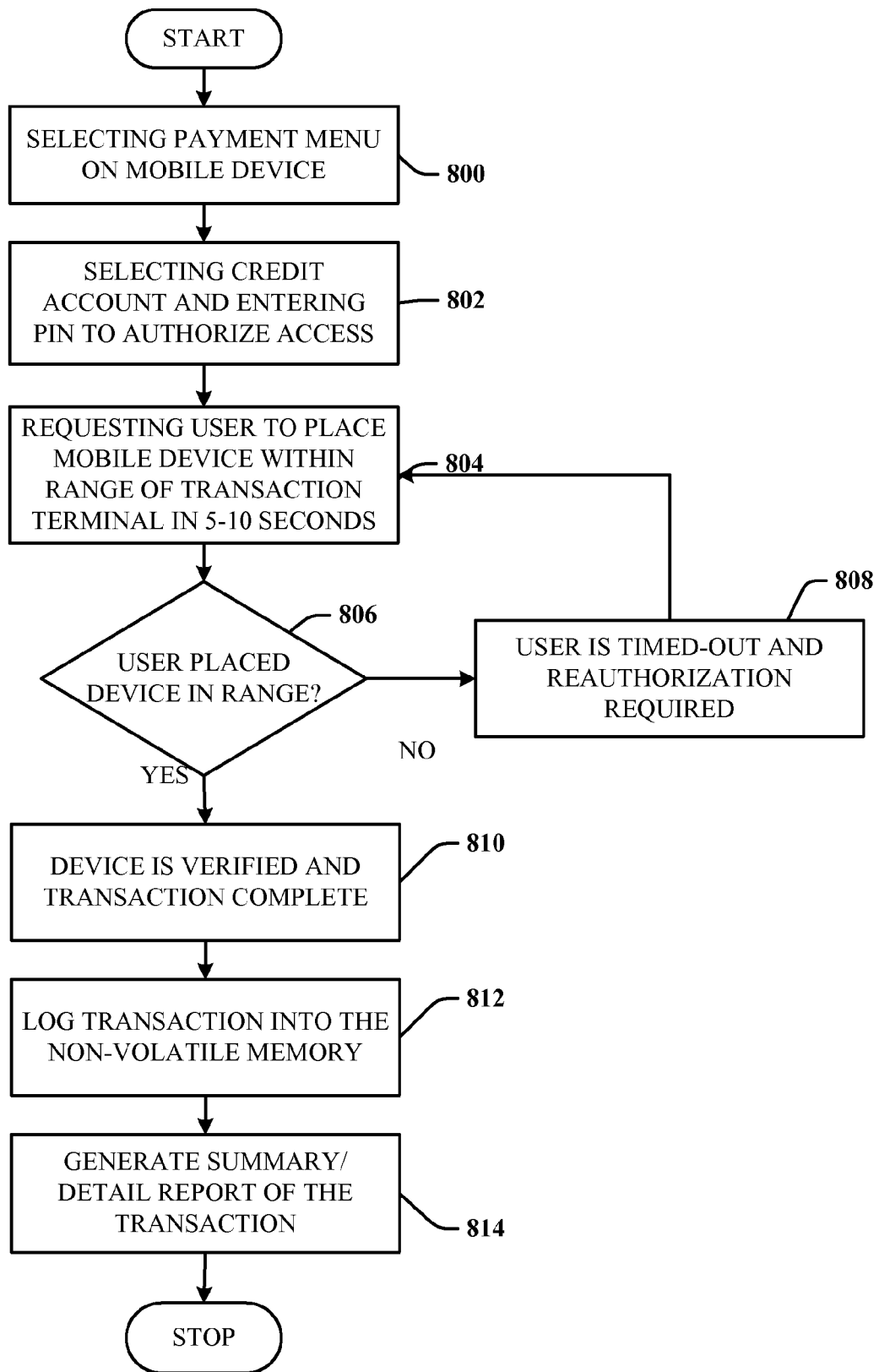
FIG. 8 illustrates a flow chart of a method of utilizing the NFC capabilities for transactions using a mobile device.

Referring to FIG. 8, a method of utilizing NFC capabilities for mobile payment is illustrated. At 800, a user selects the payment menu on their mobile device to make a credit card purchase. The payment may be made from a credit account, a debit account, a pre-paid cash account, or any similar account. The details of each account would be stored inside the flash memory, embedded in the mobile device. At 802, the user then selects the credit account to use and enters a personal identification number (PIN) to authorize access (alternatively biometric signal recognition can be used). For example, biometric data such as a fingerprint data, iris data and face data would control access to a user's account information. Accordingly, if fingerprint data were used, a fingerprint reader would be used to authenticate a user prior to transferring the account information.

At 804, the PIN number is verified and the user has 5-10 seconds to place the mobile device within the range of a transaction terminal before reauthorization is required. The payment protocol is executed between an application stored in the mobile device and a physical point of sale (e.g., end terminal, remote server, another mobile device, etc.). At 806, it is determined whether the user placed the mobile device within the range of a transaction terminal within 5-10 seconds. At 808, if the user does not place the mobile device within the range of a transaction terminal in 5-10 seconds, the user is timed out and reauthorization is required. At 810, if the user does place the mobile device within the range of a transaction terminal in 5-10 seconds, the terminal verifies the device and the transaction is complete. However, large purchases (e.g., purchases over a set dollar amount), may require a user signature at the terminal for the transaction to be complete.

At 812, the details of the payment such the product purchased, vendor, and mode of payment including a digital receipt received via NFC on the mobile device or via short message system (SMS) to view transaction details can all be stored in the flash memory of the mobile device. This information can be later presented at 814 in the form of a detail/summary report generated either by an external processor or the memory module incorporated on the mobile device. Possible transactions that are viable for NFC mobile payment include, but are not limited to, bus tickets, subway tickets, fast food restaurant purchases, convenience store purchases, downloads from smart posters, media downloads from kiosks, parking meter payments, grocery store purchases, drug store purchases, gas station purchases, movie theater tickets, restaurant purchases, sports event tickets and department store purchases.

The secure execution environment of the memory module facilitates integrated security capabilities and NFC functionality. Further, the memory module provides for authentication services and secure channel communications based on the secure execution environment it has established. The authentication services and/or secure channel communications of the memory module are used in a variety of NFC applications to create a secure environment.

Figure 9:
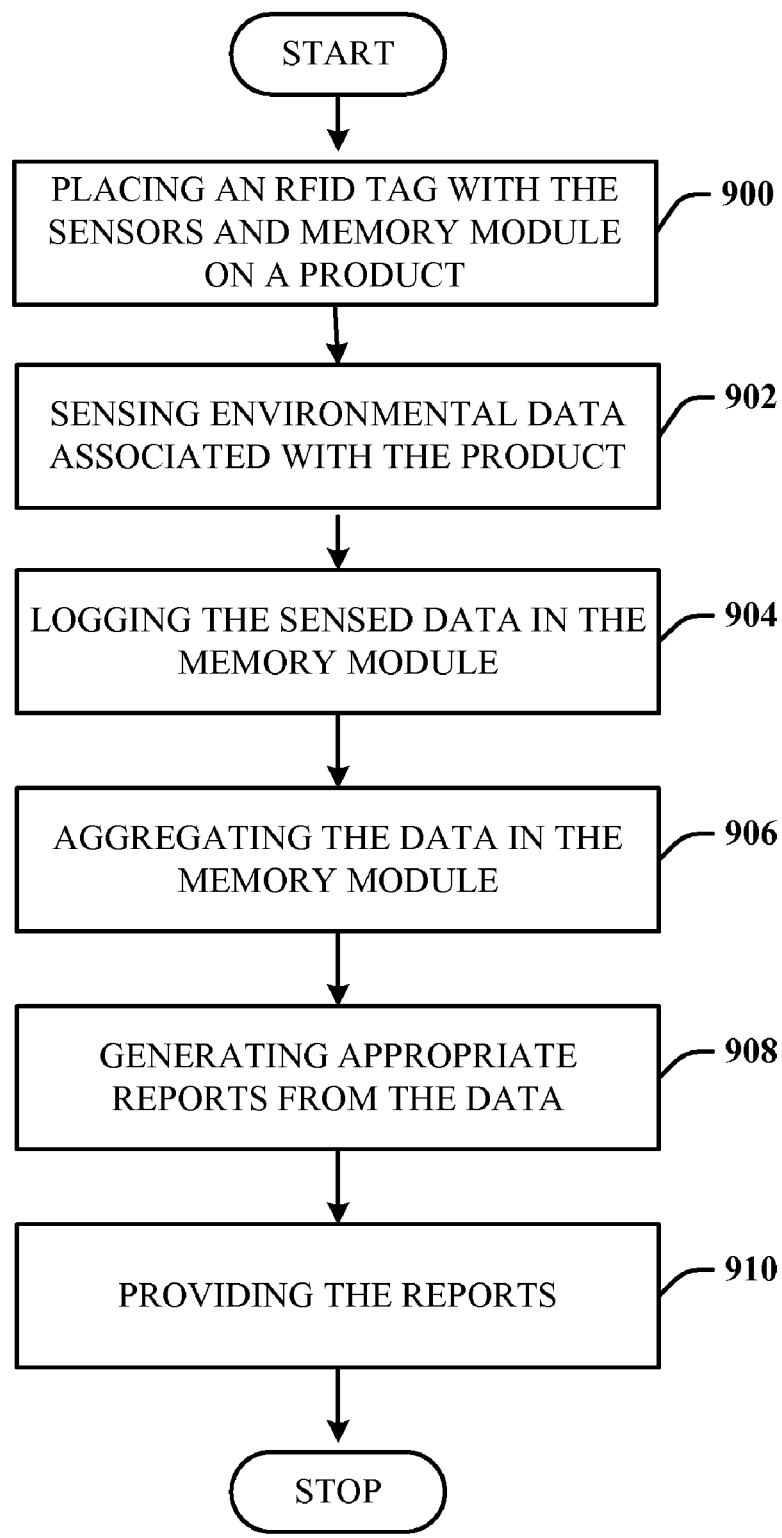
FIG. 9 illustrates a methodology for sensing various environmental parameters associated with a product.

FIG. 9 refers to a secure method for sensing, logging and presenting data implemented by an RFID tag comprising a memory module in accordance with an aspect of the claimed subject matter. At 900 a RFID tag with on board sensors and comprising a memory module is placed on a product whose environment needs to be monitored. Various aspects of the environment such as temperature or pressure during processing of a product or motion sensors to detect if a product is subjected to shock can be detected and recorded at 902. The data associated with the sensor readings is logged into the memory module at 904. At 906, the data recorded is aggregated into various formats for transmission upon receiving a signal from an RFID reader or an internal signal to share the data. At 908, various reports such as summary or detailed reports can be generated by employing the data collected from the sensors. For example, a RFID chip placed on a dairy product not only identified the product but can generate detailed or a summary report regarding its processing. At 910, the generated reports are provided either upon request or at intervals programmed into the memory module. If an external entity is requesting the reports, the data is provided only upon proper authentication by the security processor included in the memory module.

Figure 10:
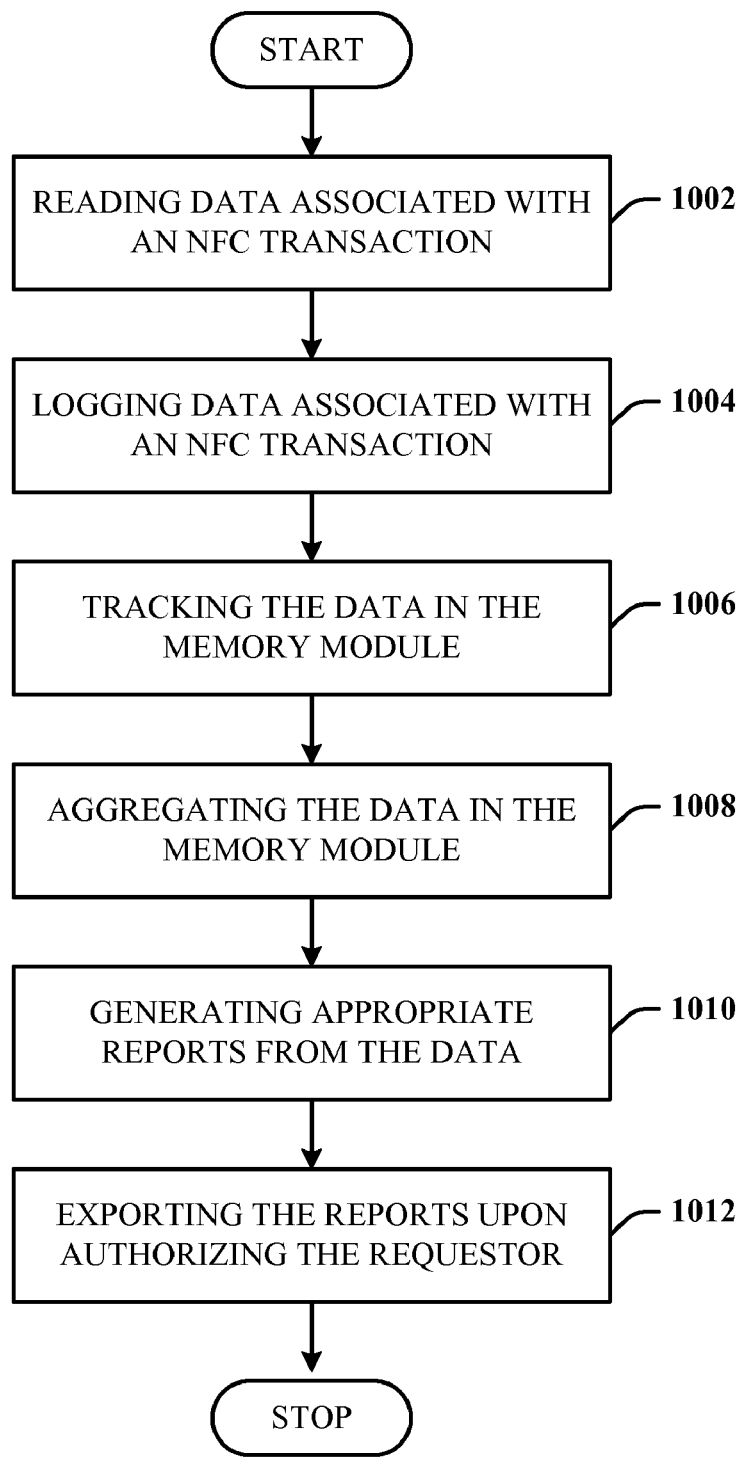
FIG. 10 illustrates a schematic block diagram of data storage and retrieval procedure in accordance with an aspect of the claimed subject matter.

FIG. 10 refers to a general methodology of collecting and presenting data implemented by the memory module in accordance with an aspect of the invention. At 1002 the data associated with an NFC transaction is read. The transactions being monitored may be payments via mobile devices, procedures carried out during processing a product, gaining access to a house or car by using a mobile device as a key etc., to name a few. The data associated with a transaction is logged into the memory module at 1004. For example, when a product is being transported the ambient conditions such temperature, pressure, etc., can be logged into the memory. At 1006, the data recorded is tracked for later access or to detect any anomalous conditions. The tracked data is aggregated at 1008 to present it to the user in a desired format. The memory module utilizes the aggregated data to generate summary and/or detailed reports at 1010. For example, an employee who uses a corporate account to make payments on a business trip may use the memory module embedded in a mobile device to generate expense reports. At 1012, the generated reports are provided either upon request or at intervals programmed into the memory module. If an external entity is requesting the reports, the data is provided only upon proper authentication by the security processor included in the memory module.

Authentication services utilized by the memory module include password authentication, shared key authentication and PKI authentication. These authentication services are used in association with three types of authentication. Type 1 is authenticating a user to the secure flash memory, type 2 is authenticating an external processor to the secure flash memory and type 3 is authenticating a server to the secure flash memory.

Further, in addition to authentication applications, the memory module also provides for secure channel communications. Specifically, the memory module provides for two types of secure channel communications used in association with the authentication services. Type 1 establishes a secure channel of communication from an external processor to the flash memory and type 2 establishes a secure channel of communication from a back end server to the flash memory.

Figure 11:
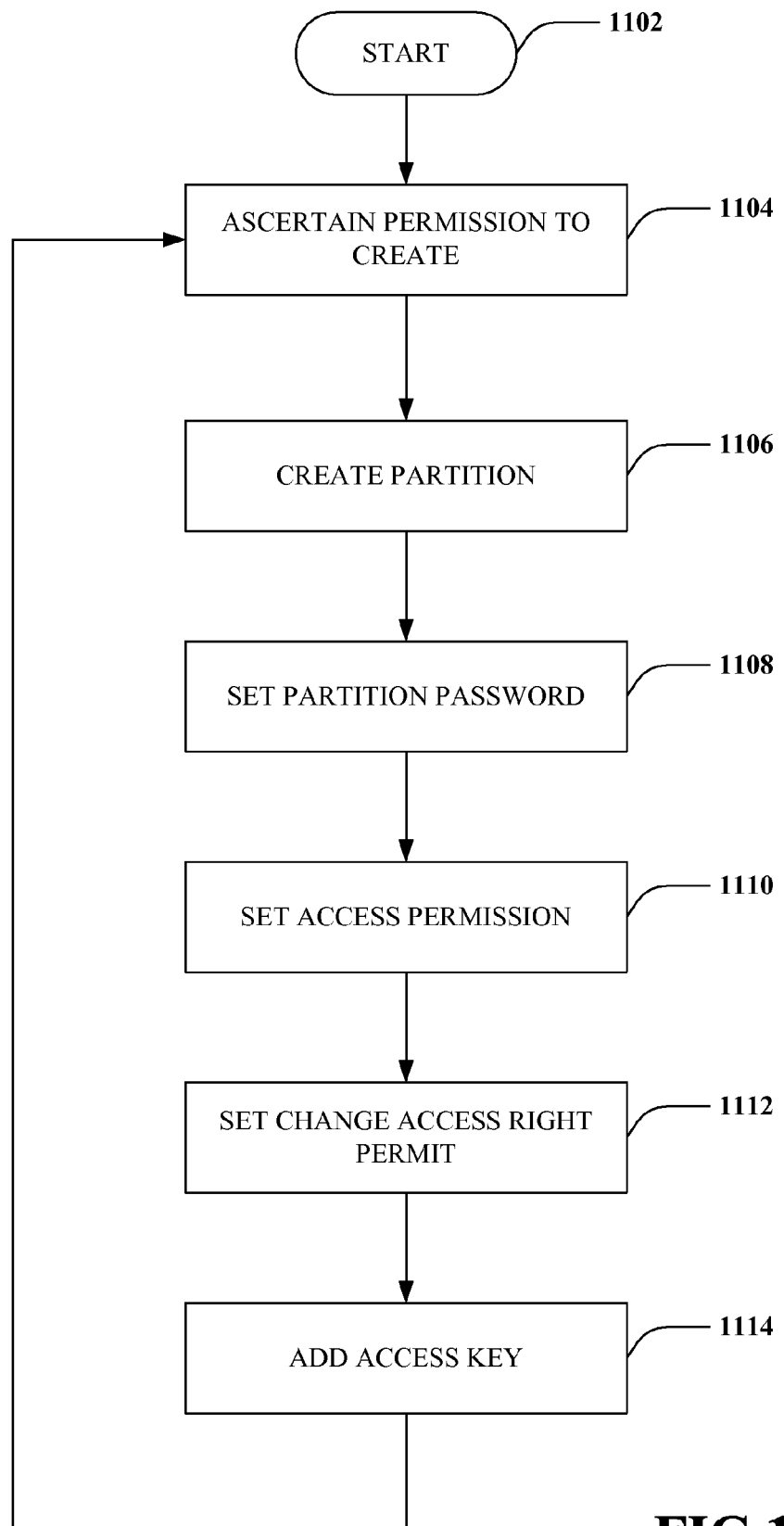
FIG. 11 illustrates a methodology for accessing flash partitions created in flash memory in accordance with the disclosed subject matter.

FIG. 11 illustrates a machine implemented methodology 1100 for creating partitions in flash memory. Method 1100 commences at 1102 where various processor initializations tasks and background activities can be performed. Once these initialization tasks and activities have been performed, the method proceeds to 1104 where authentication information (e.g., passwords) is solicited and permissions (e.g., access control data) to create partitions are ascertained. Having ascertained at 1104 that appropriate permissions exist to create a partition, the method proceeds to 1106 where a partition is created. Creation of a partition can involve determining contiguous blocks of unutilized flash memory and/or locating non-contiguous unutilized memory blocks that can be grouped to form a particular partition. At 1108 a partition password can be assigned to the created partition. At 1110 access permissions, such as "read", "write", and "change access right" can be associated with the created partition. At 1112 a change access right attribute can be set and associated with the created partition. Change access right attributes can be set, for example, to ALWAYS, WITH_PASSWORD, WITH_PKI, and WITH_PASSWORD_OR_WITH_PKI. At 1114 an access key such as a PKI key can be generated and associated with the create partition thus ensuring that only entities that have corresponding PKI keys can access the created partition.

Figure 12:
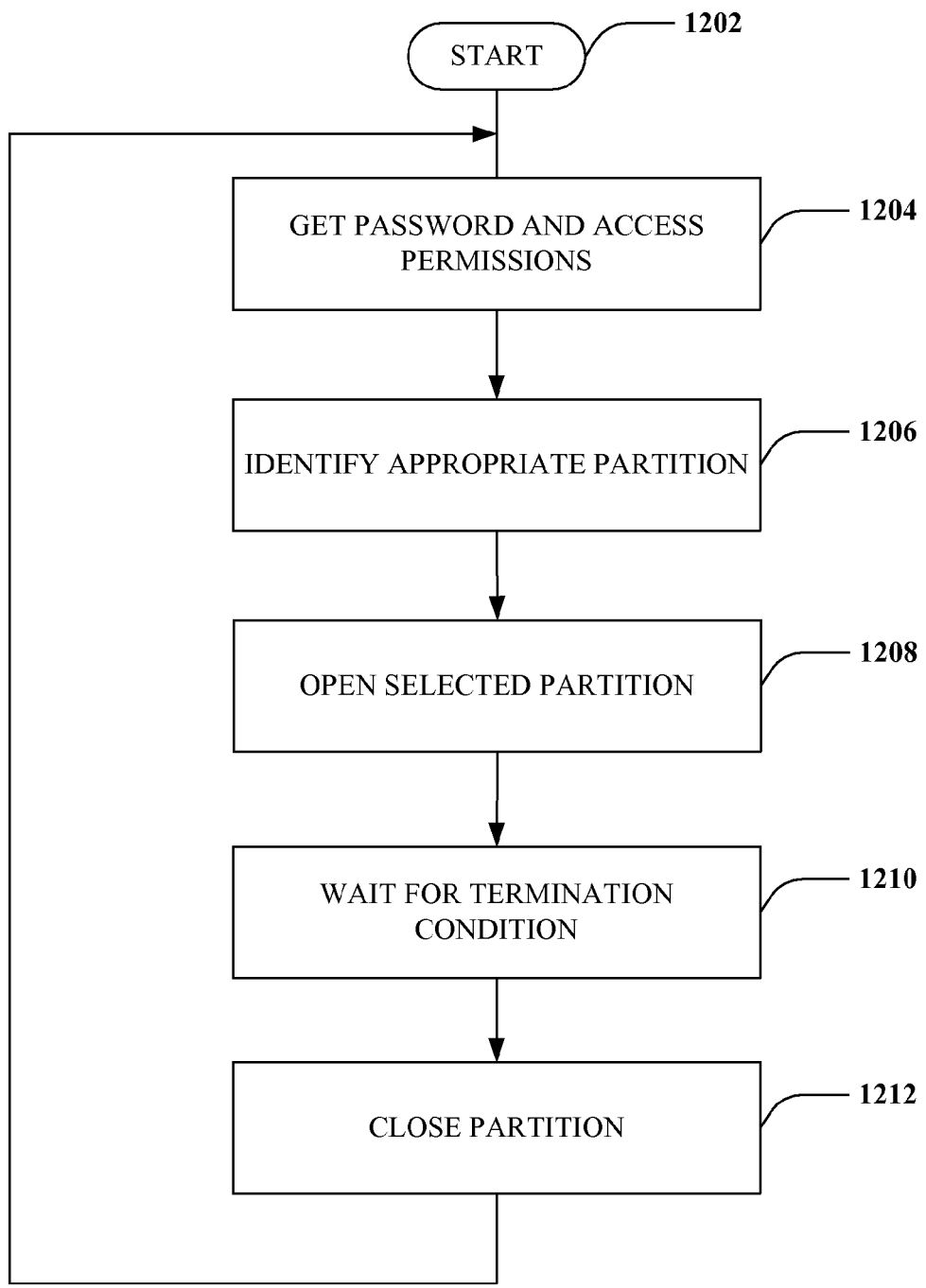
FIG. 12 illustrates a machine implemented methodology for creating partitions in flash memory associated with the memory module in accordance with an aspect of the claimed subject matter.

FIG. 12 illustrates a machine implemented method for accessing flash partitions created in flash memory of the memory module. This method commences at 1202 where various initialization tasks and background activities can be performed. Upon completion of the initialization tasks and associated background activities the method proceeds to 1204 where authentication and control access permissions are elicited from an entity attempting to access flash memory. Upon receipt of authentication and control access permission information the method proceeds to 1206, whereupon based at least on the supplied authentication information a partition associated with the authentication information can be identified. At 1208, depending on the state of the partition selected, can open the selected partition and prepare it for appropriate access (e.g., read, write, read and write, etc.). At 1210 the method can enter a wait state wherein a termination condition such as a request to close the partition is received. Typically, requests to "open" and "close" partitions will be received from an external host. Nevertheless, "open" and "close" indications can be received from other components associate with the system. At 1212 an appropriate indication to close the partition can initiate changing the state of the partition from "open" to "close" and can undertake ancillary tasks associated with closing the partition.

Figure 13:
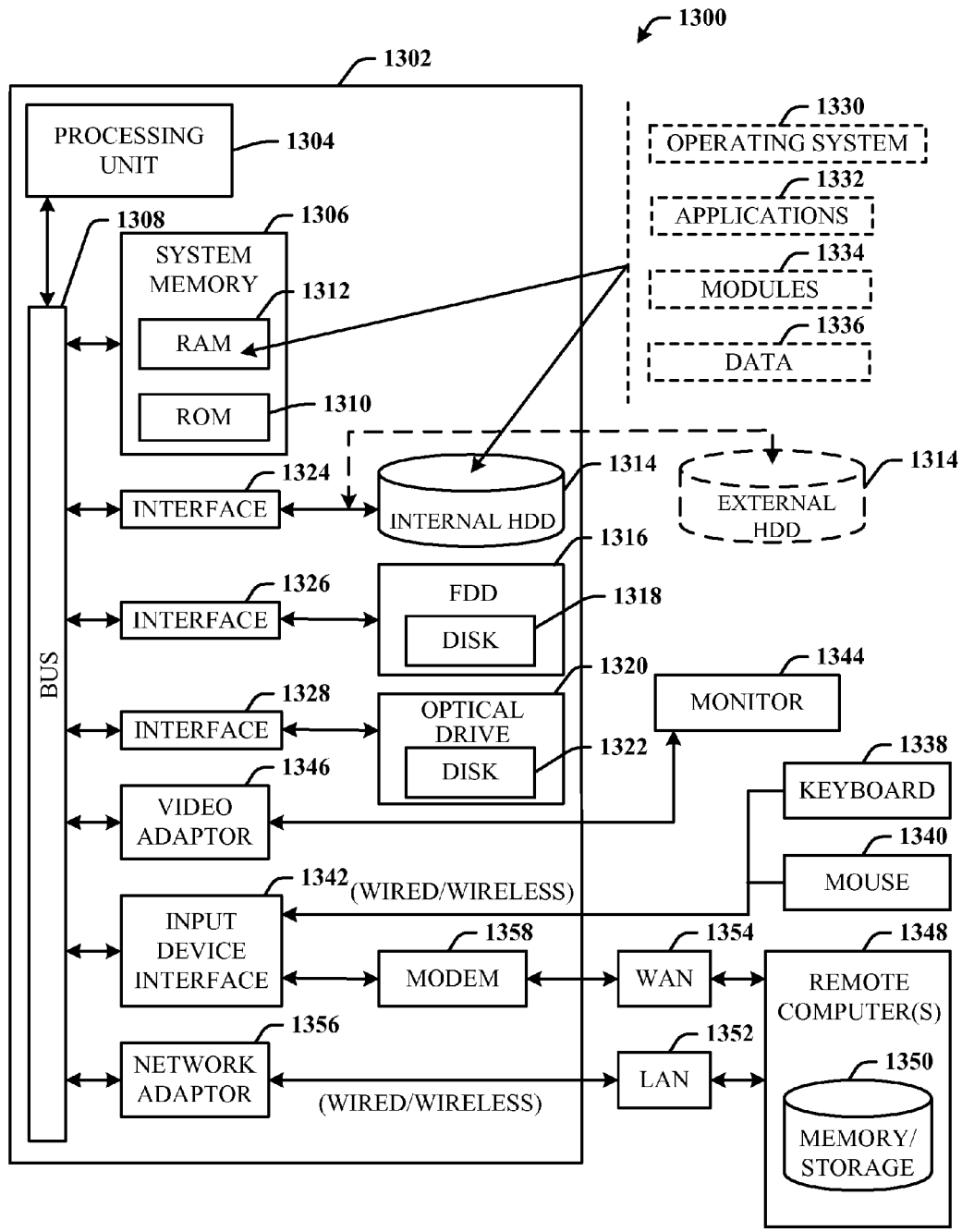
FIG. 13 illustrates a block diagram of a computer operable to execute the disclosed integrated memory module architecture.

Referring now to FIG. 13, there is illustrated a block diagram of a computer operable to execute the disclosed integrated memory module architecture. In order to provide additional context for various aspects thereof, FIG. 13 and the following discussion are intended to provide a brief, general description of a suitable computing environment 1300 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 13, the exemplary environment 1300 for implementing various aspects includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the innovation can be implemented with various commercially available operating systems or combinations of operating systems.

A user can enter commands and information into the computer 1302 through one or more wired/wireless input devices (e.g., a keyboard 1338 and a pointing device, such as a mouse 1340). Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks (e.g., a wide area network (WAN) 1354). Such LAN and WAN networking environments are commonplace in offices and companies, and facilitate enterprise-wide computer networks, such as intranets, all of which may connect to a global communications network (e.g., the Internet).

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices (e.g., computers) to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 14:
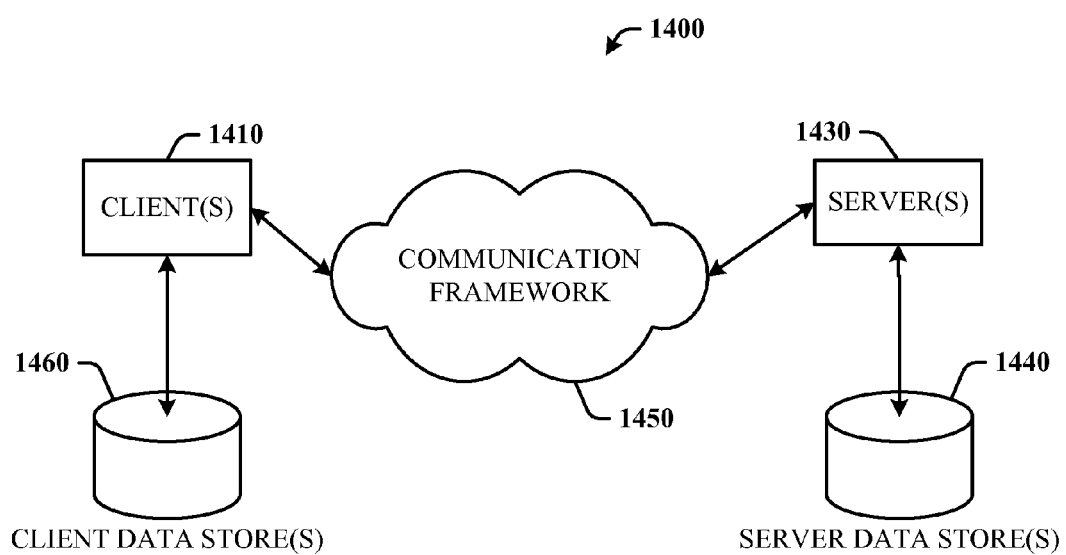
FIG. 14 illustrates a schematic block diagram of an exemplary computing environment for use with the integrated memory module.

Referring now to FIG. 14, there is illustrated a schematic block diagram of an exemplary computing environment 1400 in accordance with another aspect. The system 1400 includes one or more client(s) 1402. The client(s) 1402 can be hardware and/or software (e.g., threads, processes, computing devices). The client(s) 1402 can house cookie(s) and/or associated contextual information by employing the subject innovation, for example.

The system 1400 also includes one or more server(s) 1404. The server(s) 1404 can also be hardware and/or software (e.g., threads, processes, computing devices). The servers 1404 can house threads to perform transformations by employing the invention, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A memory module, with integrated security functionality, configured to provide a secure environment for near field communication (NFC) transactions, comprising:
  a non-volatile memory configured to store security software and data related to NFC transactions;
  a security processor configured to execute security functions based on the security software stored in the non-volatile memory, to establish the secure environment and a secure line of communication in which to control storage and retrieval of the data related to NFC transactions stored in the non-volatile memory, and to create a plurality of partitions in the non-volatile memory, wherein each partition in the plurality of partitions is accessed exclusively via the security processor; and
  a NFC component configured to implement a NFC wireless protocol to enable the memory module to participate in a NFC transaction, wherein the NFC component stores NFC transaction log data associated with the NFC transaction in the non-volatile memory via the security processor,
  wherein the non-volatile memory, the security processor, and the NFC component are integrated, as an integrated group or circuits, within the memory module.

2. The memory module of claim 1, wherein the NFC transaction includes at least one of a payment via a device that includes the memory module, an interaction with a sensor observing an operation on a product, or an access request to a secured location.

3. The memory module of claim 1, wherein the security software includes at least one of password authentication software, shared key authentication software, public key infrastructure software, integrity check software, encryption software, decryption software, anti-virus software, or anti-spyware software.

4. The memory module of claim 1, wherein the NFC component communicates with a NFC antenna external to the memory module to conduct the NFC transaction.

5. The memory module of claim 1, wherein the NFC component comprises a radio frequency identification (RFID) component configured to read data from and write data to a RFID tag.

6. The memory module of claim 1, wherein the NFC component is directly integrated into the security processor.

7. The memory module of claim 1, wherein the security processor further comprises:
a processing unit configured to execute at least one of the security software stored in the non-volatile memory, code stored in a ROM, or code stored in a RAM;
a host interface configured to communicate with the NFC component to receive the NEC transaction log data; and
a memory interface configured to communicate with the non-volatile memory to transmit data to be stored and to retrieve data stored in the non-volatile memory,
wherein the processing unit manages the host interface and the memory interface to provide a secure line of communication between the NFC component and the non-volatile memory.

8. The memory module of claim 1, wherein the security processor is further configured to individually assign permissions to partitions in the plurality of partitions.

9. The memory module of claim 1, wherein the plurality of partitions includes partitions having varying sizes.

10. The memory module of claim 1, wherein the NFC transaction log data are stored in a partition of the plurality of partitions.

11. The memory module of claim 10, wherein the security processor enforces access rights associated with the partition, such that the NFC transaction log data are stored to the partition when the security processor authenticates an originator of the data.

12. The memory module of claim 1, wherein the security processor is further configured to authenticate an external entity that attempts access to the NFC transaction log data stored in the non-volatile memory.

13. The memory module of claim 1, wherein the security processor is further configured to retrieve the NFC transaction log data from the non-volatile memory and to provide the NFC transaction log data to an authorized entity.

14. The memory module of claim 1, wherein the NFC transaction log data comprises a digital receipt of the NFC transaction, wherein the digital receipt includes at least one of a product purchased, a vendor of the product, or a mode of payment.

15. The memory module of claim 1, wherein the security processor is further configured to securely control the NFC transaction.

16. A method for storing data related to a NFC transaction, comprising:
initiating, with a NFC component, a NFC transaction with an entity;
authenticating the entity with a security processor;
partitioning a non-volatile memory into a plurality of partitions;
collecting data related to the NFC transaction; and
logging the data related to the NFC transaction to a the non-volatile memory via the security processor,
wherein the NFC component, the security processor, and the non-volatile memory are integrated into a stand-alone memory module, and
wherein each partition in the plurality of partitions is created and accessed exclusively via the security processor.

17. The method of claim 16, further comprising generating a report that includes the data related to the NFC transaction.

18. The method of claim 16, further comprising establishing a secure communication channel between the entity and the non-volatile memory via the NFC component and the security processor.

19. The method of claim 16, further comprising:
assigning access permissions to each partition in the plurality of partitions.

20. The method of claim 16, wherein the NFC transaction includes at least one of a payment via a device that includes the memory module, an interaction with a sensor observing an operation on a product, or an access request to a secured location.

21. A system for aggregating and storing data in a RFID tag, comprising:
a RFID tag comprising:
a memory module that includes a non-volatile memory configured to store security software, a security processor configured to execute security functions based on the security software stored in the non-volatile memory and to create a plurality of partitions in the non-volatile memory accessed exclusively via the security processor, wherein the security functions facilitate secure storage and retrieval of information stored in the non-volatile memory, and a NEC component configured to implement a NFC wireless protocol to enable the RFID tag to read data from an external entity and transmit data to the external entity; and
a plurality of sensors, integrated on the RFID tag, configured to generate
data related to environmental conditions of the RFID tag,
wherein the data related to environmental conditions of the RFID tag is stored in the non-volatile memory of the memory module, the security processor authenticates the external entity, and the NFC component transmits the data related to environmental conditions of the RFID tag to the external entity when authenticated.

22. The system of claim 21, wherein the plurality of sensors include at least one of a temperature sensor, a pressure sensor, or a motion sensor.

23. The system of claim 21, wherein the security processor is further configured to aggregate the data related to environmental conditions of the RFID tag and to generate a summary report.

24. The system of claim 21, wherein the RFID tag is affixed to a product.

* * * * *